Sept. 16, 1958
J. O. BURMAN, JR
2,852,059
MACHINE FOR FORMING AND NOTCHING STRIP FOR
BOX REINFORCING RIMS
Filed June 24, 1954
8 Sheets-Sheet 6

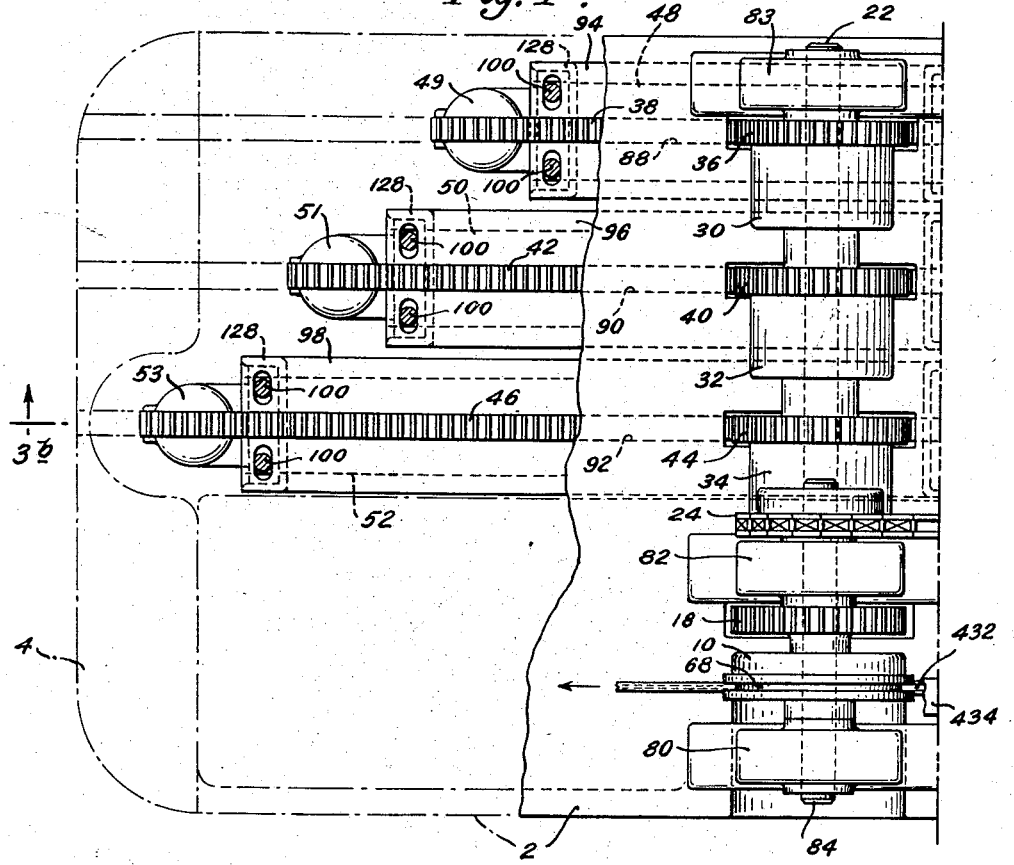

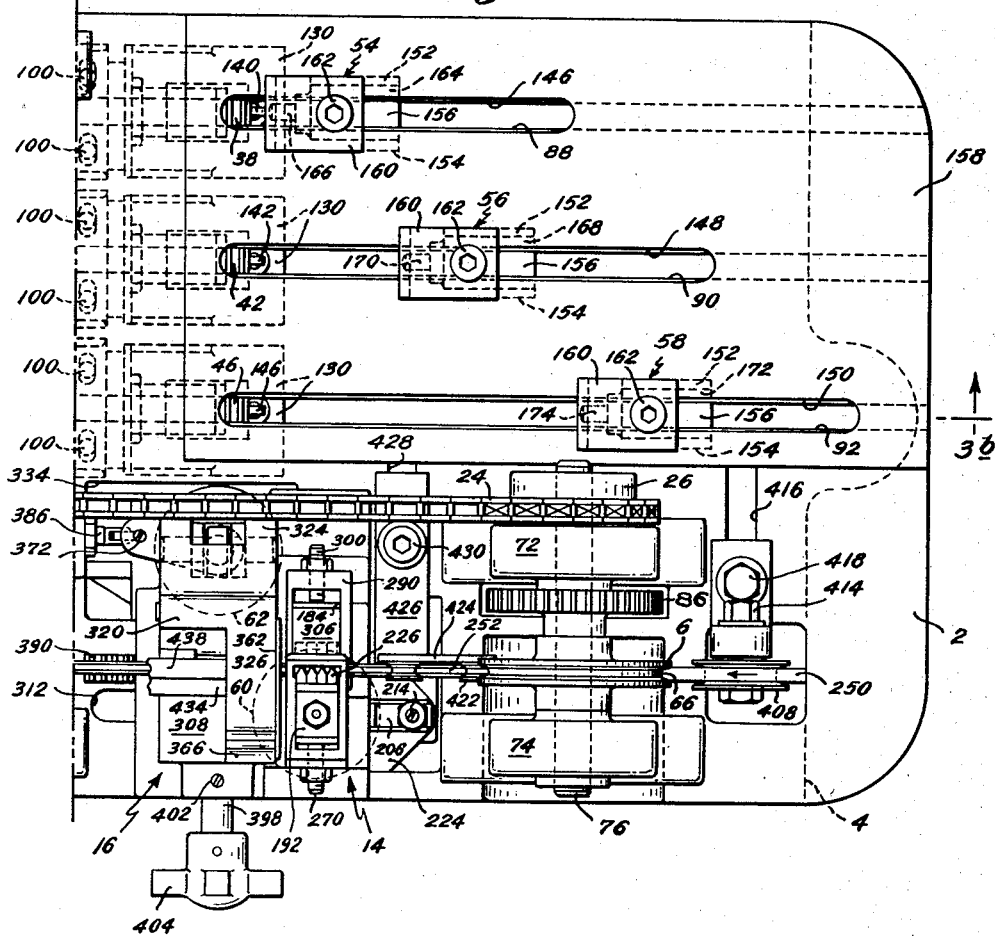

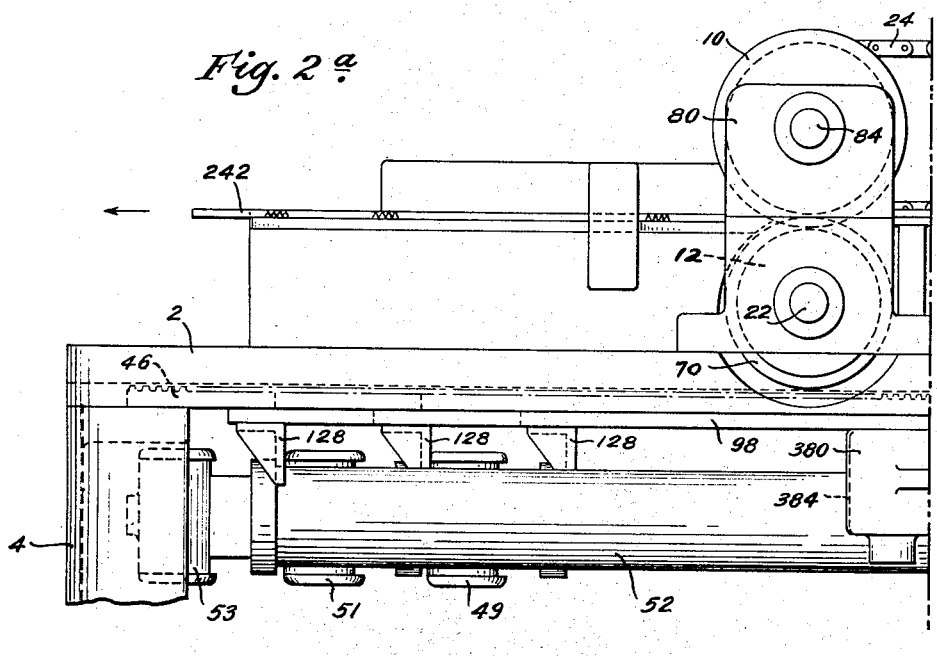
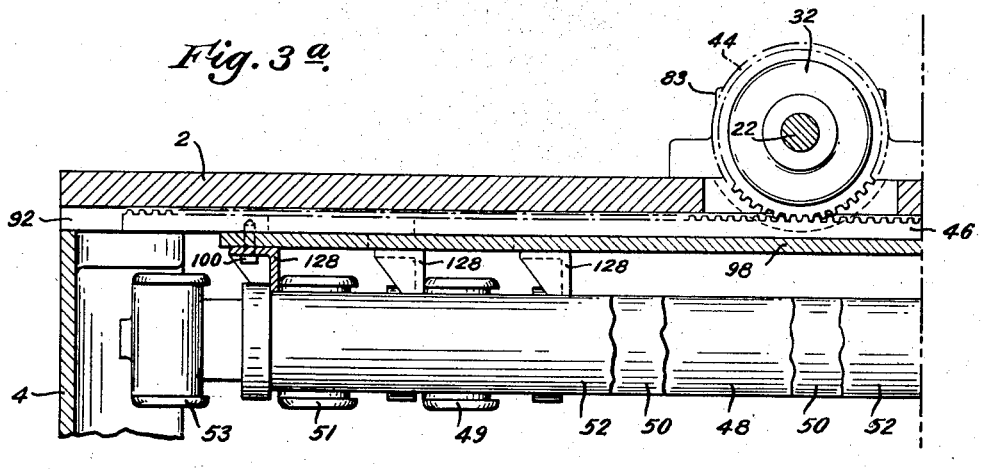

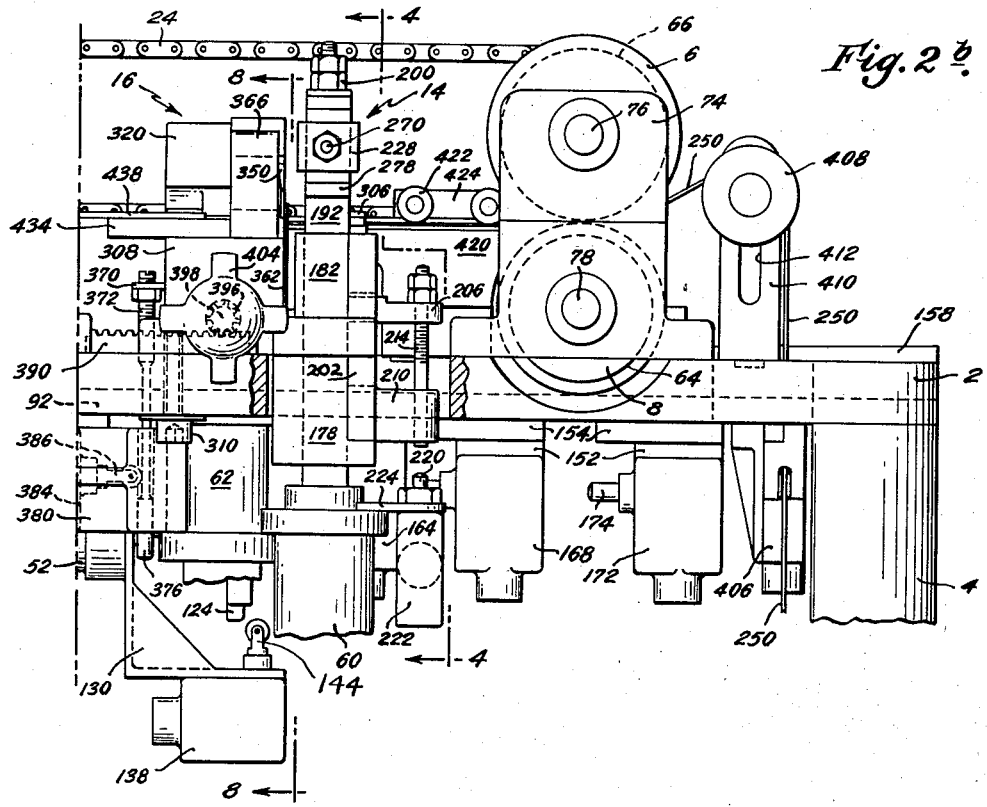
Fig. 2ᵇ.
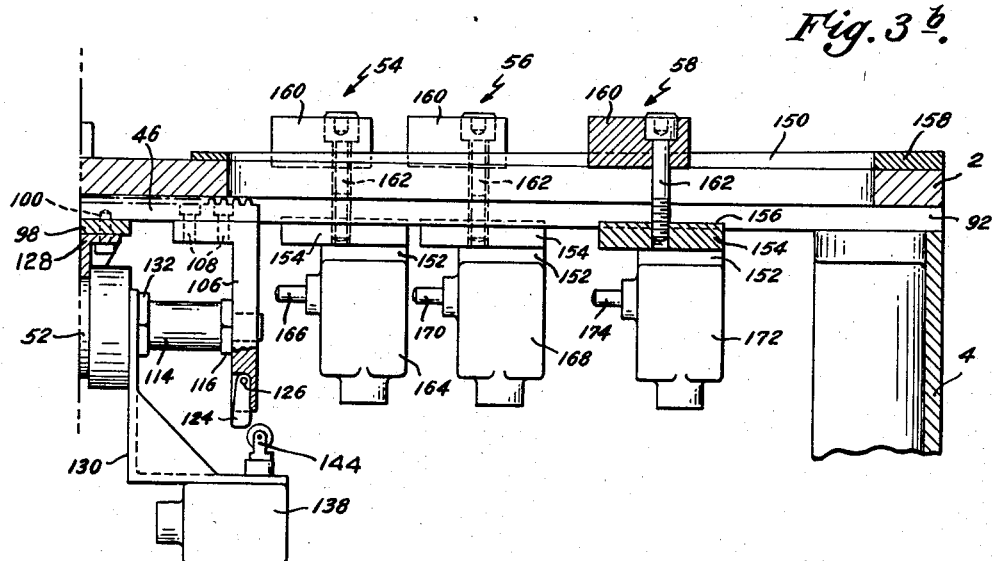
Fig. 3ᵇ.
Inventor,
Joseph O. Burman, Jr.
by Townsend M. Gunn,
Att'y.

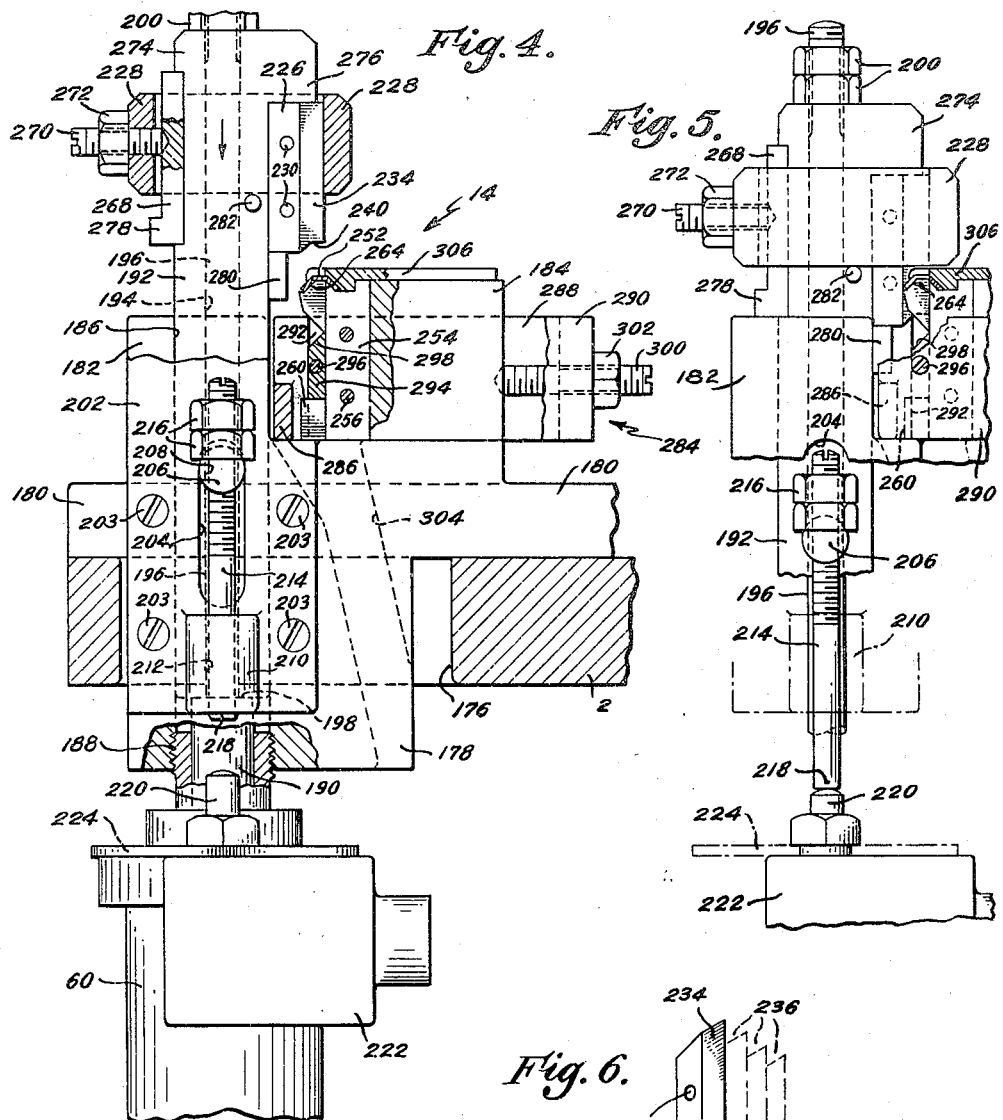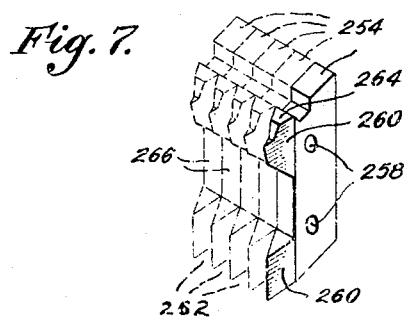

Inventor,
Joseph O. Burman, Jr.
by Townsend M. Gunn
Atty.

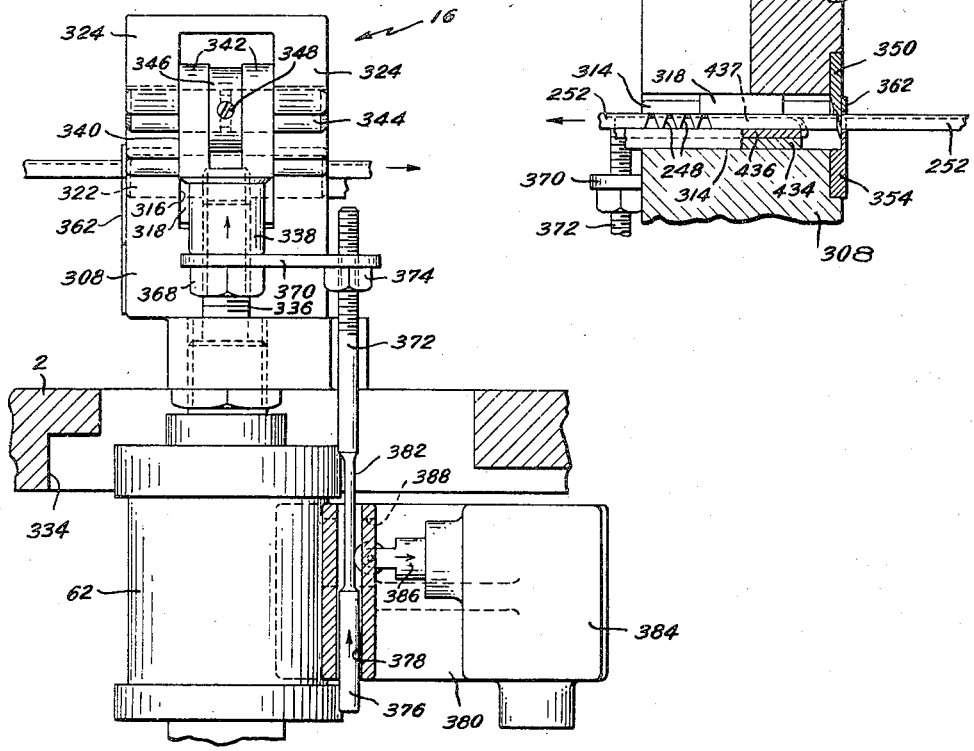
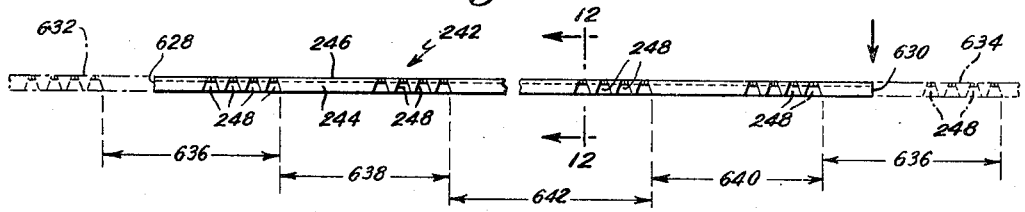
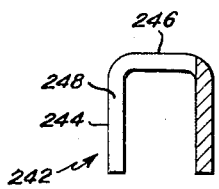

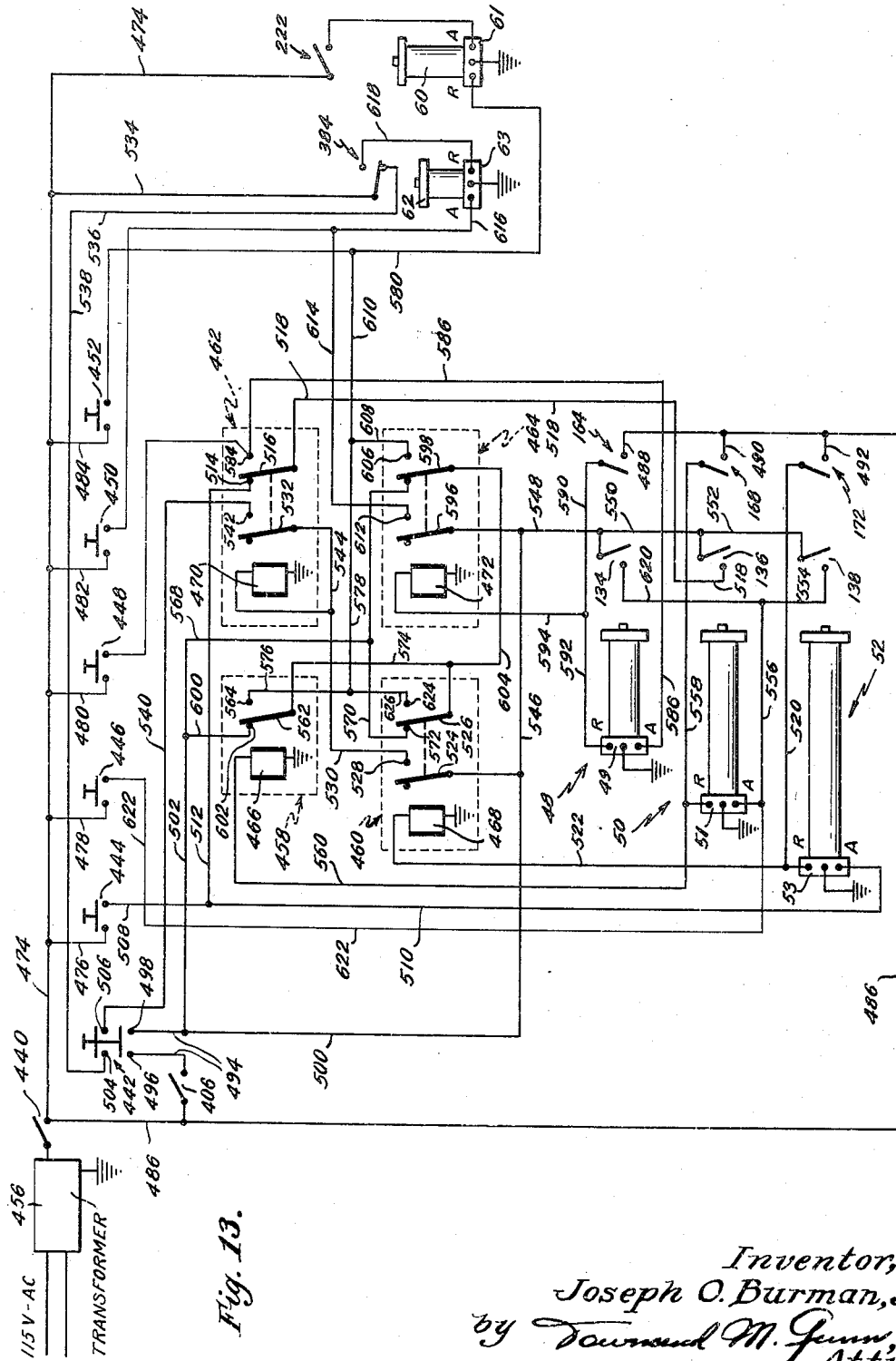

United States Patent Office 2,852,059
Patented Sept. 16, 1958

2,852,059

MACHINE FOR FORMING AND NOTCHING STRIP FOR BOX REINFORCING RIMS

Joseph O. Burman, Jr., Attleboro, Mass., assignor to Progressive Machinery Corp., Attleboro, Mass., a corporation of Massachusetts Application June 24, 1954, Serial No. 439,077

16 Claims. (Cl. 153—2)

This invention relates to a machine and method for making box reinforcing rims, and in particular to a machine for and method of making such rims automatically.

Among the several objects of the invention, therefore, may be noted the provision of a machine for making a box reinforcing rim automatically; the provision of a machine of the class specified which forms such a rim in U-channel shape from strip stock automatically; the provision of a machine of the class described which automatically at predetermined intervals along a strip of stock notches the stock to facilitate later bending; the provision of a machine which automatically forms strip stock into a channel, notches said stock at predetermined intervals, performs a further subsequent bending operation thereon, and separates said formed and notched stock from the main body of strip stock; the provision of a machine of the last described class which severs the stock between notches so that the tail end of rim strip is equal to the front end of the next succeeding rim strip; the provision of a machine of the class described in which a predetermined number of notching operations and a predetermined number of measuring operations may be performed automatically in correct sequence on flat stock to make a U-shaped channel for reinforcing box rims capable of being bent where notched; the provision of a machine of the last-named class in which said notching and measuring operations may be carried out automatically, or individually under the operator's control; the provision of a notching sub-element so constructed as to be readily repaired and sharpened; the provision of a method of making rims of the kind hitherto specified in which a sequence of steps of measuring and notching is carried out with a shearing step interposed between two notching steps to form the tail end of one rim and the lead end of the succeeding rim; and the provision of machines as specified and method which are economical and simple to make and operate. Other objects will be in part obvious and in part pointed out hereinafter.

The invention accordingly comprises the elements and combinations of elements, steps and sequence of steps, features of construction and manipulation, and arrangements of parts which will be exemplified in the structure hereinafter described, and the scope of the application of which will be indicated in the following claims.

In the box industry, particularly that of the type which specializes in making decorative boxes for the jewelry industry, it is often times customary to place on the exposed rims of the box bottom and top decorative rims, these generally being of metal of some color contrasting pleasingly with the other colors of the box. Such rims are generally in the form of a U-shaped channel made of thin strip stock, the channel of necessity being mitered or notched at the places where it is to bend around the box corners.

In the past it has been the practice to form such rims on automatic machinery (so far as making the U-channel is concerned) and then the proper notches were cut into the channel at proper intervals by a hand operated punch. The cost, therefore, of such rims has been relatively high. It is also true that some machinery of the automatic or semi-automatic type has been developed to make such rim. However, such machines have been complex, difficult to adjust and keep running, difficult to repair, and generally cumbersome.

The machine of the present invention, therefore, has for its basic purpose the improvement of presently known methods of making such rims, and there is herein described a machine which is fairly small, economical to operate, easy to adjust, and which makes rims rapidly on a simple, economic basis.

In the several drawings in which are illustrated several views of one embodiment of the invention and its component parts:

Figs. 1(a) and 1(b) are, respectively, the left and right halves of a top view of the embodiment;

Figs. 2(a) and 2(b) are, respectively, the left and right halves of a front view of the Fig. 1 embodiment;

Figs. 3(a) and 3(b) are, respectively, the left and right halves of an elevation in section, taken in the direction of sight lines 3b—3b on Figs. 1(a) and 1(b).

Fig. 4 is an end elevation, partly in section, of a notching element of the embodiment, taken in the direction of sight lines 4—4 on Fig. 2b;

Fig. 5 is a view showing a portion of Fig. 4, but showing the parts of Fig. 4 in a different operating position;

Fig. 6 is a perspective view of a sub-assembly of a notching punch used in the Fig. 4 assembly;

Fig. 7 is a perspective view of a sub-assembly of a notching die mating with the Fig. 6 punch in the Fig. 4 assembly;

Fig. 9 is an enlarged back view, partly in section, taken in the direction of sight lines 9—9 on Fig. 8, to show in greater detail the shearing element shown in Fig. 8;

Fig. 10 is a front elevation, in section, of a portion of the Fig. 9 shearing element taken in the direction of sight lines 10—10 on Fig. 8;

Fig. 11 is a side view of a rim strip made as a product of this embodiment;

Fig. 12 is a cross-section of the Fig. 11 product, taken in the direction of sight lines 12—12 on Fig. 11; and Fig. 13 is a schematic diagram of a control circuit adapting the above embodiment for either automatic or manual operation.

Throughout the drawings, similar reference characters indicate corresponding parts.

Figure 8:
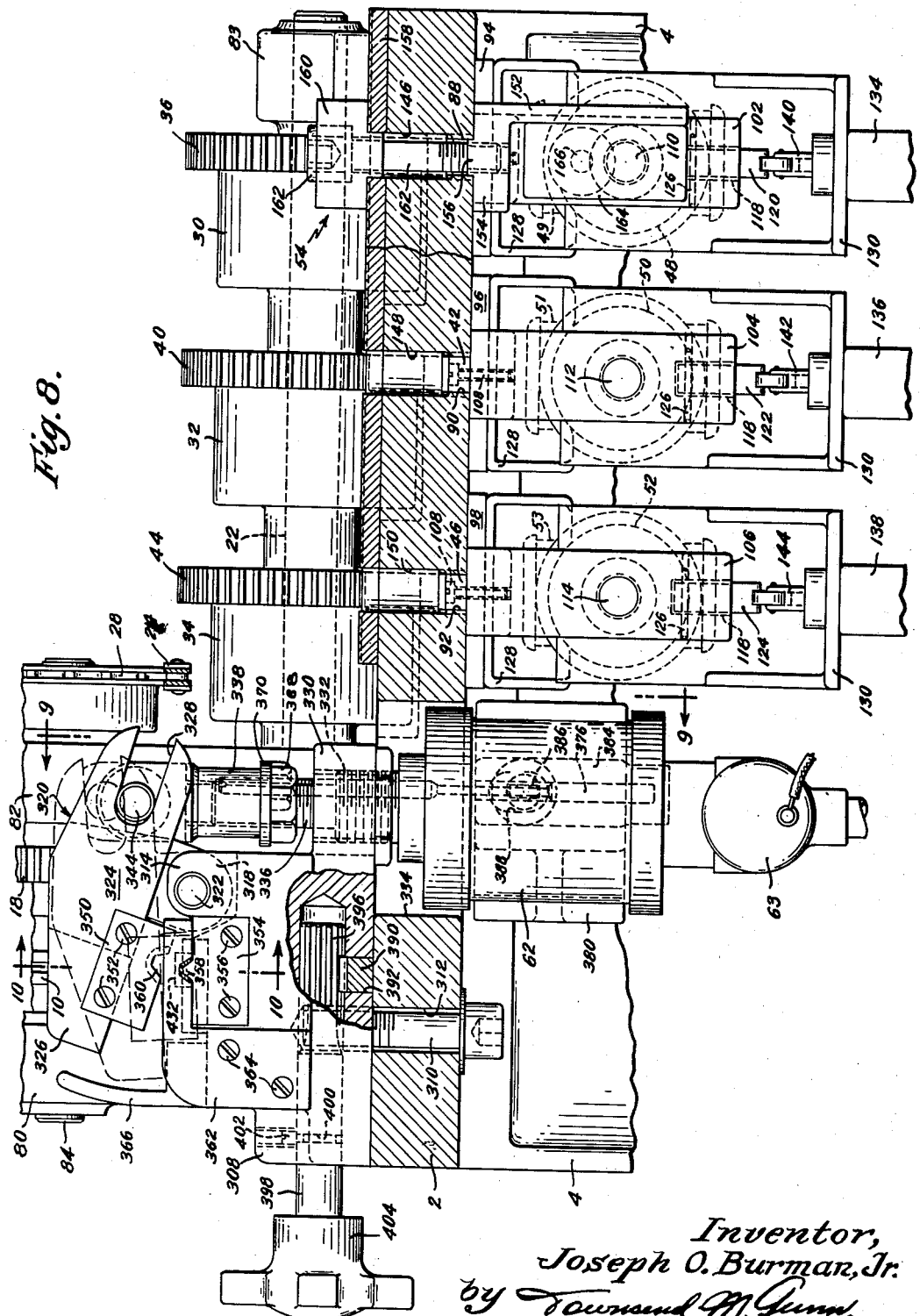
Fig. 8 is a cross-sectional side elevation of the Fig. 1 embodiment, taken in the direction of sight lines 8—8 on Fig. 2b.

Turning now to the drawings for a complete description of the device, it will be observed that the machine comprises a group of sub-assemblies interconnected electrically, hydraulically, and mechanically, which cooperate to produce the end product. The subassemblies are, generally speaking, a relay control circuit, a stock feed and forming means, a measuring means, a notching means, and a shearing means. To describe these and their workings adequately, this application is divided into the following headings: I. General arrangement and location of the various sub-assemblies and brief description of operation; II. The feed, forming, and measuring means; III. The notching means; IV. The shearing means; V. Miscellaneous construction details; VI. The control circuit and the operation of the machine.

I. *General arrangement*

The working elements are mounted on a table 2 which is supported on legs 4, the latter being shown only in part since they are conventional. The feeding means comprises the two pairs of feed and forming rolls, the pairs being indicated as the entrance rolls 6 and 8, and the exit rolls 10 and 12. Positioned between these respective pairs is the notching mechanism indicated generally by numeral 14, and the shearing mechanism 16. A gear 18 drives roll 10, this gear being driven by a gear (not shown) mounted on shaft 22 and meshing with gear 18. A sprocket chain 24 connects, by means of sprocket wheels 26 and 28 fastened to the respective shafts of the rolls, the rolls 6 and 10, so that rotation of roll 10 drives roll 6.

Shaft 22 is driven in one direction only, by the three slip or overrunning clutches 30, 32, and 34, each of these being able independently to drive the shaft 22. These three slip clutches are driven by three rack and pinion assemblies having the components: pinion 36, rack 38; pinion 40, rack 42; and pinion 44, rack 46. The pinions are fastened, in each case, to the barrel of the respective clutch, the hubs of the clutches all being fastened to shaft 22.

Racks 38, 42 and 46 are driven respectively by the fluid operated cylinders 48, 50 and 52. In this instance, by way of example only, air operated cylinders are used. Water or oil operated cylinders would operate just as well. It is the motion of the pistons of these cylinders in driving the racks, that feeds stock into the machine in predetermined spacing between successive notchings. The extent of the cylinder and rack motion is determined by the adjustable measuring-stop means 54, 56 and 58, one being provided for each cylinder-rack combination.

Separate cylinders 60 and 62 are provided to actuate, respectively, the notching and shearing means 14 and 16. As above stated, these cylinders are preferably air-operated, but water or oil cylinders may also be used satisfactorily.

Briefly described, the operation of the device is as follows: One of the feed cylinders, say cylinder 48, moves its rack 38 to the right (as drawn on Fig. 1b). This rotates the associated pinion 36 which turns the respective clutch barrel. This rotates shaft 22 and feed rolls 6—8 and 10—12. Stock is fed into the notching means 14 (hereinafter called the notcher). At the end of the forward stroke of cylinder 48, a switch is actuated which causes the rack to retract (move to left), and which also causes both the notcher and shearing means to operate. As rack 38 nears the end of its retract stroke, it trips a switch which actuates cylinder 50. This latter advances, and feeds another measured portion of stock into the notcher, and actuates the notcher but not the shearing means. On its retract, cylinder 50 actuates cylinder 52, which in turn feeds stock, actuates the notcher, and retracts. On retract, cylinder 52 re-actuates cylinder 50 which again feeds a predetermined amount of stock and actuates the notcher. On its retract, cylinder 50 re-actuates cylinder 48, which feeds stock, and actuates both the notcher and shearing means. On its retract cylinder 48 re-actuates cylinder 50 again, and this cycle repeats itself indefinitely until the machine is shut off or runs out of strip stock.

The above cycling is controlled by means of an electromagnetic relay circuit which is shown schematically in Fig. 13. Conventional relays may be used, of the double-pole, double-throw type. The relays, four in number, may be housed in an enclosure and mounted either on the top of table 2 in a convenient space, or in any other convenient place. Properly mounted start and stop switches are also provided, these also being located in a convenient place. Since such relays and switches are conventional, and since their mounting is well within the skill of the ordinary mechanic, they have been shown only schematically in the drawings.

II. *Feed, forming and measuring means*

As indicated above, the feeding, forming, and measuring means is done by a series of cylinder driven racks rotating pinions which turn feed rolls, the amount of turning, and hence feeding, being governed by adjusting the length of the stroke of the cylinder piston.

(It is to be noted herein that reference is made to a cylinder's driving a rack, or a notcher, or shearing means. In the particular embodiment shown, it is the piston rod of the cylinder that actually moves to drive the rack, the body of the cylinder being attached to the table. It is obvious, of course, that the end of the piston could, in each case, be attached to the table with the cylinder body being attached to the part to be moved. Therefore, the generic expression of "the cylinder moving" or "cylinder driving" is to be taken herein as meaning either construction.)

The feed rolls are also the forming rolls, and the forming is an important part of this invention. It is done in two parts, as will now be explained.

As will be evident from an examination of Fig. 11, the finished rim 242 is in the form of a U-shaped channel, with one side 244 and a portion of the bend (or top) 246 of the channel notched at certain intervals, as shown at 248 (see Figs. 11 and 12). As the strip stock enters the machine, however, it is in the form of flat stock 250 which must be bent to the final channel form. This is done in two stages: Feed and form rolls 6 and 8 form the stop into a channel whose sides form an angle with each other, that is, for example, an inverted V-shaped channel 252 having a flat bottom (see Fig. 4). This is done by having the perimeter of roll 8 chamfered to provide angled sides 64, and the perimeter of roll 6 is provided with a V-shaped groove 66 into which the chamfered sides or roll 8 fit or mesh. When flat stock now passes between these rolls, it is bent downwardly to form the flat bottomed inverted V-shaped channel 252. The shape of this channel is clearly shown in Fig. 4 as it passes through the notching means. The purpose of this is to provide a partly formed channel one of whose sides is presented to the downwardly moving notcher punch in a position to be readily notched thereby. If, on the contrary, the U-shaped channel were completely formed with vertical parallel sides by rolls 6 and 8 the downwardly moving notcher punch would be punching against the edge of the strip stock instead of its face, and would tear. To punch properly a U-shaped channel, the punch would have to move perpendicularly against a face, and this would present a difficult problem of chip clearance from between the walls of the channel. To notch one side of flat stock, and then bend the resulting notch prongs into a U-shape, presents serious difficulties in so bending the prongs. However, by partly forming the channel into the V-shape, both notching and the remaining forming operation into the final U-shape are made easy.

After rolls 6 and 8 have so formed the stock, it passes through the notcher 14 and shearing means 16 to the exit feed and forming rolls 10 and 12. In this case, the groove 68 in the perimeter of roll 10 is made U-shaped as shown in Fig. 1a, and the perimeter 70 of roll 12 is shaped to fit the groove. When the stock passes between these rolls, the V-shaped notched channel is formed into the final U-shape.

It will be understood that rolls 10 and 12 also grip the stock to feed it to the left, this being necessary because the shear 16 severs the stock and hence rolls 6 and 8 cannot push the severed stock between a U-shaped forming tool; also, because of the severance, rolls 10 and 12 cannot pull stock into the machine. Rolls 6 and 8 also grip the stock to feed it.

The rolls 6 and 8 are mounted in customary manner in bearing plates 72 and 74 by means of shafts 76 and 78. Rolls 10 and 12 are similarly mounted in bearing plates 80 and 82 by means of shafts 22 and 84. In each case, the spacing of the rolls is such as to admit stock between the formed perimeters. It is to be noted that the edges of the rolls are knurled to provide a good grip on the stock.

It has already been pointed out that shaft 22 drives a gear which meshes with gear 18 to drive roll 10, gear 18 being fastened to shaft 84. Thus both of rolls 10 and 12 are power driven. Sprocket wheel 28 is also fastened to shaft 84. In similar manner, sprocket wheel 26 and roll 6 are both fastened to shaft 76. Also fastened to shaft 76 is a gear 86 which meshes with an identical gear (not shown) fastened to shaft 78. Thus the rolls 6 and 8 are both power driven and at the same speed as rolls 10 and 12, the sprocket wheels 26 and 28 having equal teeth and pitch. Since rolls 6, 8, 10 and 12 are the same diameter, stock feeds between the respective rolls without slippage.

As has been indicated, shaft 22 is driven by any one of the three slip clutches 30, 32, and 34, the shaft being journalled in bearing plates 80, 82 and 83. By the name slip clutch is meant the kind of clutch which will rotate the shaft 22 in one direction (say, counter-clockwise as viewed in Fig. 2(a) when the barrel of the clutch is rotated by a rack, but which does not rotate the shaft clockwise when the barrel rotation is reversed by reverse motion of the respective rack. (As an example may be mentioned the clutch manufactured by the Hilliard Manufacturing Corporation of Elmira, N. Y. and called by them an "overrunning" clutch.) To the barrel of each of clutches 30, 32 and 34 is fastened, respectively, in any conventional manner the pinions or gears 36, 40 and 44. The hubs of the clutches engage shaft 22. The racks 38, 42, and 46 slide in grooves 88, 90 and 92 provided in the under side of the table 2, and are slidably fastened therein by means of the respective rack support plates 94, 96 and 98. These plates are fastened to the under side of table 2 by means of conventional machine bolts 100. Thus it is seen that each rack is free to slide in its respective groove or channel, lengthwise of the table, turning the respective pinion and clutch barrel as it does so.

Dependent from the front (right) end of each rack are the rack end brackets 102, 104 and 106, these being pinned to the end of the respective racks and fastened in place by machine screws 108 in conventional manner. Each of rack end brackets 102, 104 and 106 is provided with a suitably located hole which receives in threaded engagement the ends of the piston shafts 110, 112 and 114 of the cylinders 48, 50 and 52 respectively. A locknut 116 is provided on each piston shaft to prevent the piston shaft from becoming disengaged from its respective bracket. Thus, motion of each piston shaft moves each respective rack.

Each of the rack brackets has its end extending down below the piston shaft, and each such end is provided with a groove 118 in which pivot the trip levers 120, 122 and 124 on a suitably provided pivot pin 126. It will be noticed that each trip lever can rotate clockwise for a limited movement about its pivot pin, but not counter-clockwise (as viewed in Fig. 3b), being stopped by the back of the respective groove.

Each of cylinders 48, 50 and 52 has attached, as by welding, to each end thereof the mounting brackets 128. Each of these brackets is provided with mounting holes which dimensionably match the mounting holes in the rack support plates 94, 96, and 98. Thus machine bolts 100 are enabled and do serve to hold both these cylinder mounting brackets and the rack support plates securely clamped to the underside of table 2. From the front (or right) end of each cylinder depends a switch mounting bracket 130, this being fastened to the cylinder in any conventional manner. In the particular embodiment, each bracket has its upstanding leg fitted over a threaded stub on the end of each cylinder, and a nut 132 serves to hold the bracket in place. Mounted conventionally on each of the brackets 130 is an electrical switch having normally open contacts. The bracket for cylinder 48 mounts switch 134, the bracket for cylinder 50 mounts switch 136, and the bracket for cylinder 52 mounts switch 138. The switches 134, 136, and 138 are actuated by respectively, the plungers 140, 142 and 144 each having a roller thereon, as shown. The switches are so positioned that when the respective rack bracket with its trip lever is moved to pass over the plunger of the switch, the trip lever swings freely clockwise so as not to depress the plunger. However, on the return or retract motion of the rack, the trip lever in each case strikes the respective switch plunger and presses it downward to close, momentarily, the switch contacts. The switch plunger is released when the rack bracket has passed completely over it, as shown in Fig. 3b.

Mention has already been made of stop members which adjustably limit the motion of the cylinder piston shafts, and thus govern the amount of stock feed that each cylinder imparts. These will now be described:

Table 2 is provided with three longitudinal slots 146, 148 and 150, and it is in these slots that the adjustable stops 54, 56 and 58 are moved and clamped. As shown, these slots are of three different lengths, since generally a box to be fitted with the rim product of this machine has sides of different lengths. (It is also to be noted that the cylinders provided are also of different lengths, for the same reason.) However, all slots and all cylinders can be of the same length, if desired, the maximum length being determined by the maximum length of box side, and by the pitch of the racks taken with the diameter of the feed rolls. Each of the three stops is constructed in the same way, and comprises a bracket having a vertical leg 152 and a top support plate 154. The upper surface of each support plate is provided with a rib 156 which slidably fits the respective slot (150, for example, see Fig. 3(b)). Mounted on top of the table is a wedge-shaped plate 158. The shape of this plate is clearly indicated in Fig. 3b, and is thinner at the left than at the right. Plate 158 is provided with slots that match slots 146, 148 and 150, and is firmly bolted to the table top. A clamping shoe 160 is provided for each stop member, and each shoe has on its under surface a rib or key similar to that on support plate 154, which slidably engages the respective slot. A headed bolt 162 passes through the shoe 160 and threads into the support plate 154. These members may then be clamped tightly together to lock the stop member in place by tightening the bolt.

At this point, a particular feature of the invention should be noted, and that is the provision of the wedge-shaped plate 158. When the piston of a cylinder forces its rack end bracket against a stop member, a sharp blow is struck against the stop members, due to the force and speed of the piston, and the inertias of the moving parts. It was found that without the plate 158, successive blows on a stop member would cause a shift in the latter's position, no matter how tightly the bolts 162 were turned. However, with the plate 158 in place, any motion of a stop member to the right because of a cylinder actuated blow, has the effect of increasing the separation of the shoe and support plate of the stop member. This can take place, if at all, only by stretching the bolt. As a result, it has been found that the plate 158 serves to prevent any such shift of the stop members. It has been found that a wedge angle such that there is a thickness change of approximately 0.012 inch for every one inch of length of the plate, is sufficient. It is preferable, of course, to incline the bottom of the shoe 160 the same angular amount as found in the plate 158, so as to have the thrust of the bolt 162 exerted correctly.

To each of the vertical legs 152 is fastened a switch having normally open contacts, and actuated by a plunger to close these contacts. To the stop member 54 is thus mounted switch 164, having switch plunger 166. To stop member 56 is mounted switch 168 having plunger 170. And to stop member 58 is mounted switch 172 having plunger 174. It will be noted that the front (or left)

end of the top support plate 154 of each of the stop members, acts as an abutment against which the right hand surface of each of the rack brackets 102, 104 and 106 strikes to stop the motion of the respective rack and cylinder piston. Each switch is so mounted on the vertical legs 152 of the stop members that the front (or right) of each rack bracket is able to depress the respective switch plunger enough to close the switch contacts, the top support plate preventing further motion which would damage the switch.

Each of cylinders 48, 50 and 52 is provided with electrically operated valves (respectively, 49, 51 and 53) for admitting air or other proper fluid into the cylinders. These cylinders are of the kind which require air or other fluid pressure on one side of the piston to move it in one direction and fluid pressure on the other side of the piston to move it in the opposite direction. The valves for the cylinders are of the kind to be operated by momentary electrical impulses, and when the advance terminal (A in the drawings) of the valve is momentarily electrically energized, the piston of the respective cylinder moves forward, or to the right as drawn. It stays in this right hand position until the retract terminal (R in the drawings) is momentarily energized, which actuates the valve to let fluid into the other side of the piston to move it leftward to its "at rest" or starting position.

To recapitulate briefly: The feed rolls 10 and 12 are energized by rotation of the slip clutches in one direction. This rotation is caused, as to each clutch, by a predetermined but adjustable length of stroke of the respective rack. Roll 10 drives rolls 6 and 8, so as to feed stock into the machine in accordance with the length of rack stroke. As each rack advances (or moves forward or to the right) its trip lever slips over one switch, and the rack momentarily closes another switch at its forward position. On its retract stroke, the rack momentarily closes the switch it formerly slipped over. The feed rolls first form part of the final shape, one side of the channel is notched, and the final shape is imparted by the exit rolls. At proper intervals, a length of formed strip is sheared from its parent body.

III. Notching means

Mounted on table 2 between the two sets of feed and forming rolls is the sub-assembly heretofore designated generally by numeral 14 and called the notcher. The notcher is the "punch and die" sub-assembly that punches into one side of the channel-shaped rim reinforcement, the notches 248 (see Fig. 11), the purpose of these being to relieve the side of the strip so that the U-shaped channel may be bent to fit around a corner of the box. The notcher is a unitary sub-assembly which mounts through a hole 176 suitably provided in the table. The notcher comprises a casting 178 provided with the sidewise extending lips 180 which rest on and are bolted to table 2. The casting 178 is milled to provide a vertical post 182 of generally rectangular shape, this post extending both above and below the table top, and a second vertical post 184, also of generally rectangular cross section.

Post 182 is provided with a vertical channel 186 extending the length of the post, this channel being rectangular in cross-section. The lower end of this channel is threaded, as at 188, to provide a threaded hole for engaging the threaded end of the notching cylinder 60 as shown, thus to mount the cylinder. When so engaged, the shaft or piston rod 190 of the cylinder is axially in alignment with the axis of the channel 186. A rectangularly shaped ram 192 is provided which slidably fits channel 186. Ram 192 is provided with an axial center hole 194 which slips over the end portion 196 of piston rod 190 which has been reduced in diameter so as to provide a shoulder 198 against which ram 192 seats. The end of the piston rod is threaded as shown to receive the nuts 200 which serve to clamp the ram 192 securely to the piston rod. A cover plate 202 is provided for channel 186 to hold ram 192 in place, being fastened by screws 203 as shown. Plate 202 is provided with a slot 204 extending therethrough, and a stud 206 is fastened to ram 192 and projects through slot 204 to the right as shown in Fig. 2b. A threaded hole 208 is provided in the end of stud 206. A stud 210 is provided at the bottom of cover plate 202, and a guide hole 212 is provided in this stud axially in vertical alignment with hole 208. A threaded and hence adjustable striker rod 214 slidably passes through hole 212 and screws into hole 208. Lock nuts 216 maintain the adjusted position of rod 214 in the threaded hole 208. The end of rod 214 projects far enough below the stud 210 so that when ram 192 is at the bottom of its downward stroke, the end 218 of the striker rod depresses the plunger 220 of switch 222 to close the normally open contacts of this switch. Switch 222 is mounted by conventional means to the bracket 224, which is fastened to the cylinder 60 as by welding.

The punch of the notcher consists of a series of plates 226 fastened together in face to face relation in a retaining and clamping yoke 228. Plates 226 are held in alignment by means of dowel pins 230 which snugly fit into holes 232 provided in each plate. An edge of each plate is beveled, as shown, to provide what is hereinafter called a land 234, and the lands 234 therefore define the grooves 236. The bottom corner 238 of each of lands 234 is faced off as shown at 240 so that the profile of this end of a land matches approximately the profile of the side and bottom of the V-shaped partly-formed rim stock 252, as can be seen in Fig. 4.

In like manner, the "die" of the notcher is made of a set of plates 254, held in alignment in face-to-face relation by dowel pins 256 which snugly fit holes 258 in each plate. Again, each plate has a beveled edge 260 which is called hereinafter a land, and the lands 260 define the grooves 262. The upper ends of lands 260 are faced off as shown at 264 to conform to the partly formed cross-sectional shape of the V-shaped channel 252, as shown in Fig. 4. In addition, each land 260 is recessed as shown at 266 to provide a space to receive a clamping bar 294 which will later be described.

It is to be realized, of course, that although in the above description a V-shaped notch has been provided, and the first forming on the flat stock is that of the V-shaped channel 252, nevertheless, other shapes of notches could be provided by giving the lands the desired shape in cross-section. Also, the exact shape of the V-shaped channel is not critical, and it can be varied. The criterion is, however, to present a face of stock to the cutting edges of the "punch" and "die" at an angle which will permit chip clearance, and avoid tearing, and yet be sufficiently formed so as to facilitate the complete forming after the notches are cut.

The thickness of the several plates 226 forming the notcher "punch" is such that the total thickness of an assembly equals the width of the ram 192. A punch assembly on its dowel pins, such as is shown in Fig. 6, is placed on the back of the ram, as shown in Fig. 4, and a four-sided clamping yoke or frame 228 is placed around the "punch" and the ram. Also inserted between the yoke and the ram is the thrust plate 268. A set-screw 270 which threads into a suitably provided threaded hole in the end plate of the yoke 228, is now tightened to bear against the thrust plate 268 and draw the yoke against the lands of the punch, thus clamping the punch to the ram. Lock nut 272 holds the set-screw from turning after it is clamped up tight. The ram 192 has its top end provided with laterally extending integral projections 274 and 276. These projections act as shoulders against which the punch and thrust plate may butt, as shown. Thrust plate 268 is provided with a laterally extending projection 278 and this projection acts as a striker plate or stop for the ram when it is pulled downward by the cylinder 60. Projection 278 strikes against the top of post 182, as shown in Fig. 5. A short support bar 280 is fastened, by screws for example, to the ram 192 and serves as a bottom support for the plates 226. A pin 282 is fastened to the ram, and serves as a locating stop to assist in determining the correct position of yoke 228 before the set-screw 270 is tightened.

The die assembly of plates 254 is fastened to post 184 in a manner similar to that described above for the punch. Again, the thickness of the plates 254 is such that the total thickness of the assembly is equal to the width of the post. It is to be noted, however, that the position of the die assembly with respect to the punch assembly is such that the lands 234 will mesh into grooves 262, and lands 260 will mesh into grooves 236. This can be accomplished in several ways. If it is desired to have the plates 226 and 254 of equal thickness (for example, to facilitate their being made from a single length of cutter bar stock) then a spacer plate can be inserted in a yoke to position one set of plates sidewise by half the thickness of the plates. Or, the position of post 184 can be governed, during the milling of the post, to be off-set by the necessary one-half of the plate thickness. Other ways will readily suggest themselves to the skilled mechanic. In the particular embodiment, the last described method was used.

It is also to be noted that the beveling which produces the lands, is such that the grooves and lands accurately and closely fit each other. The post 184 and ram 192 are so positioned in respect to each other that when the plates are clamped in place, a land of one assembly fully engages, depthwise, a groove of the other assembly. Furthermore, with the above construction, it is not necessary to fill the yokes with all the plates shown. If it is desired to cut only one notch, for example, only one plate is used as a punch, and two plates in the die. The rest of the space in each yoke is filled with blank filler blocks to support the plates sideways.

The yoke 284 used for clamping the die assembly is constructed differently from yoke 228. In this instance, the yoke again is a four sided frame, but in order to provide chip clearance, the front wall or end 286 is made only approximately half-height. It will also be observed that wall 286 does not touch the lands 260, and that a clearance has been provided therebetween. The two side walls 288 and 290 of the yoke are provided with vertical grooves 292, one of which is partly shown in Fig. 4. A thrust plate 294 has its ends fitting into these grooves, and is held thereto by the screws 296. Plate 294 is of a size to fit into the recess 266, and thus bears against the fronts of plates 254. Plate 294 has its top edge beveled, as shown at 298 to provide chip clearance. A set-screw 300 is threaded into the end wall of the yoke, as shown, and bears against the back of post 184. When this screw is tightened against the post, it brings the plate 294 up against the plates 254 to clamp them securely to the front of the post. A lock-nut 302 is provided to maintain the adjustment of screw 298.

A hole 304 is provided in the notcher body 178 to permit chips to fall therethrough into a receptacle. A stripper plate 306 is also provided in customary fashion, to strip the stock 252 from the punch as the latter rises.

To recapitulate, actuation of cylinder 60 pulls ram 192 downward, thus moving the punch assembly downward far enough to have the cutting ends of lands 234 slide by the cutting ends of lands 260. The side and bottom of the V-shaped channel 252 are thereby cut out in the form of notches 248. The downward motion of the ram is stopped by the striker plate 278 hitting the top of post 182. The striker rod 214 is adjusted so that at the bottom of the ram stroke, the plunger 220 of switch 222 is pushed in far enough to close the contacts of this switch as shown in Fig. 5. As will be described later, closing these contacts will actuate the cylinder 60 to move the ram up again to its Fig. 4 position. Cylinder 60 is the same type as cylinder 48, and has an electrically operated valve (not shown) of the type described for cylinder 48, for operating it.

IV. *Shearing means*

Generally speaking, the shearing means is in the form of a stationary cutter plate against which works a movable cutter plate fastened to a rocker arm. The cylinder 62 actuates one end of the rocker arm and the movable cutter blade is fastened to the other end of the arm. Cylinder 62 is of the type described for cylinder 48, and has a valve 63 like valve 49.

Referring to Figs. 8, 9 and 10, the shearing means comprises a bed 308 which is clamped to table 2 by means of clamp bolt 310, the latter passing through an extended slot 312 in the table. Bed 308 has its top milled down somewhat to provide a flat working space for stock to be sheared and guide means therefor, and to provide the upstanding post 314 into which is milled the slot 316. Received rotatably in slot 316 is the stem 318 of a rocker arm indicated generally by numeral 320, stem 318 being retained in place by means of the pivot shaft 322 which nicely fits properly aligned pivot shaft holes in the post 314 and stem 318. Formed as an integral part of rocker arm 320 are the rearwardly extending parallel arms 324, and the forwardly extending cutter arm 326, these being on opposite sides of a line through the pivot shaft 322. Arms 324 have therein the slots 328.

An extending lip 330 on the bed 308 is bored and tapped as at 332 to receive the threaded attaching stub of the cylinder 62, the latter projecting downwardly through a suitably dimensioned elongated hole 334 in table 2. The threaded end 336 of the piston rod screws into the hub 338 of a bifurcated knuckle 340. The legs 342 of the knuckle are bored to slidably receive the pivot shaft 344 which is of a size to fit nicely the slots 328. A collar 346 is provided with a set screw 348 as shown, and is fastened thereby to shaft 344 between the legs 342, this collar thus anchoring the shaft in its proper place. A movable cutter blade 350 is fastened to the cutter arm 326 as shown, by means of screws 352. A stationary cutter blade 354 is likewise fastened to the bed 308 by means of screws 356. The edges of these cutter blades are beveled to present shearing surfaces to the stock which are proper for the thickness and type of the material used. In this case, the cutting edge of cutter blade 354 is shown as being square across, while the edge of blade 350 has been given a decided backward rake or bevel. It is to be noticed that the respective cutting edges are properly formed to receive the V-shaped channel as it comes from the notcher. That is, the stationary blade has an upstanding projection 358 having the profile of the cross-sectional shape of the rim stock, and the movable blade has the corresponding notch 360. As the V-shaped channel 252 is being cut by the shear, it is thus supported properly. A stripper plate 362 is provided in customary manner, this being fastened to bed 308 by means of screws 364. A guard fence 366 is provided on bed 308 in front of cutter arm 326 to prevent accidental jamming or cutting of the operator's hands.

A nut 368 on the threaded end 336 of the piston rod of cylinder 62 serves to clamp one end of a bracket 370 between it and the end of hub 338. The other end of the bracket is provided with a threaded hole into which screws one end of a striker rod 372. A lock-nut 374 locks the striker rod in adjusted position. The lower end 376 of the striker rod is guided slidably in a hole 378 in a bracket 380 which is fastened by conventional means to the cylinder 62. The striker rod has a section 382 thereof reduced in diameter as shown. Also mounted on bracket 380 is the switch 384 which has its actuating plunger-and-roller 386 extending into a slot 388 in the wall of hole 378 in such position, that when the piston rod of the cylinder moves up, carrying with it the bracket 370 and rod 372, the end 376 of the rod will force the plunger inward to operate the switch contacts. When the parts are in the position shown in Fig. 9, the reduced section 382 of rod 372 permits the plunger of the switch to move out.

Switch 384 is a single pole double-throw switch, having a common lead and normally closed, and normally open, contacts. When the plunger is in the Fig. 9 position, cutter blades are apart, the switch is in position to have the normally closed contacts in closed position. When the piston moves up to shear stock, the plunger 386 is moved in to open the normally closed contacts and close the normally open contacts. As will be explained later, closing the normally open contacts of this switch actuates the cylinder to move the piston downward.

It has been mentioned earlier that the shearing means is adjustably positioned. This is done by means of a rack 390 which is fastened to the top of table 2 and fits into a channel 392 provided in the bottom of bed 308. The teeth of the rack face upwards. A bore 394 is provided in bed 308 and meets channel 392 in such position that a pinion 396 at the end of adjusting shaft 398 may be inserted in the hole to engage the teeth of the rack. Shaft 398 is provided with a groove 400 around its circumference, and a set-screw 402 which is threaded into the bed as shown, engages this groove to rotatably lock the shaft in the bed. A knob 404 is fastened to the end of shaft 398. To adjust the shearing means, the clamping bolt 310 is loosened, and knob 404 is turned to move the whole shearing mechanism to a predetermined position on table 2. Bolt 310 is then tightened again.

Thus it is seen that when cylinder 62 is actuated the piston rod thereof moves up, pushing up on the arms 324. This rocks the rocker bar 320 about the pivot 322 and brings together the cutter blades to sever a portion of the strip stock being formed, this position of the rocker arm being shown in dotted lines in Fig. 8. At the end of this motion, the striker rod 372 actuates switch 384 to return the rocker arm to the position shown in Fig. 8.

V. Miscellaneous construction details

The cutter blades are both made of tool steel hardened to the proper amount for shearing the rim stock being used. The remaining working parts are made from castings of iron or steel, or cold or hot rolled steel, as experience dictates. It is preferred to use electrical switches, throughout, of the snap-acting kind. Fluid connections are made by conventional feed lines, rubber hosing being used for compressed air where the cylinders being used are air operated. It is understood that suitable filters should be provided, as well as oil atomizers, where air cylinders are used, in accordance with standard practice.

The thin flat strip stock used for making the rim reenforcing product of this machine, generally can be purchased wound on reels. Such a reel may be mounted on the machine in any conventional manner, in a proper place (not shown herein), and the stock carried through a material indicating switch structure whose normally open contacts are kept closed as long as stock is passing through the structure. Such a structure is indicated generally by numeral 406, and its details are not given because such switches and their working are well known in the art. After the material passes switch 406, it passes up through a hole in table 2, and over a guide pulley 408 mounted on a standard 410. The shaft of pulley 408 is adjustably carried in a slot 412 in the standard, so the height of the pulley may be varied, if desired, by loosening nut 414 which locks the pulley shaft to the standard. The standard itself is adjustably positioned on the table by means of the slot 416 therein and the clamping bolt 418.

After the V-shaped channel emerges from the forming rolls 6 and 8, it rides on a guide rail 420 which leads the channel to the notcher. A pair of V-shaped rollers or guide wheels 422 are mounted on plate 424 which in turn is fastened to a standard 426, the latter being adjustably positioned on the table by means of the slot 428 and clamp bolt 430. The rollers 422 serve to hold the V-shaped channel onto the guide rail. After the notched V-shaped channel leaves the notcher 14, it again lies on top of a guide rail between the shearing means and the notcher. Since this distance is generally short, no top rollers are used here. After the material is sheared, however, it again rides on top of a guide rail indicated generally by numeral 432, and is led by this to the forming rolls 10 and 12. The guide rail 432 has been broken to show its construction, there being a bottom fastening plate 434, on which is fastened a guide channel 436. Inside guide channel 436 is the guide rail proper 437, shaped to fit the inside of the V-shaped channel stock. A cover 438 may be used, if desired, to hold the V-shaped channel on to the guide rail. The guide 432 is removably fastened to the bed 308 of the shearing means (see Figs. 10 and 1b).

It has been pointed out that the periphery of the form rolls 8 and 10 is knurled so as to grip the stock better as it passes through the feed rolls, this knurling being done on the periphery of the beveled edge 70 (and the corresponding periphery of the roll 8) so that any marking of the stock by the knurl will be on the inside of the channel and hence not visible when the channel is placed on a jewelry box.

VI. Control circuit, and adjustment and operation

Referring now to Fig. 13 there is shown schematically the control circuit, this circuit showing in heavy lines the connections for automatic operation of the machine, and in lighter lines additional connections that may be added to give manual operation.

In addition to the switches already set-forth heretofore, the circuit has the main power switch 440, the single-throw double-pole switch 442, the manually operated impulse switches 444, 446, 448, 450 and 452, the power transformer 456, and the electromagnetic relays 458, 460, 462, and 464, relay 458 being single-pole double-throw, and the other relays being double-pole double-throw. These relays are actuated by the customary coils 466, 468, 470, 472, respectively. In order to simplify the wiring and control circuits, the relays and electromagnetic valves on the cylinders are all powered by low voltage alternating current, supplied by transformer 456. In order to simplify the schematic circuit, one side of the power has been shown as a ground connection, the appropriate corresponding ground connection being indicated on each valve and relay coil. Also, on each cylinder the A is the "advance" terminal which when energized will cause the piston rod of the cylinder to move out, and the R is the "retract" terminal which when energized causes the piston rod to be pulled back into the cylinder. The relays are shown in their deenergized position.

It will be observed that after it passes switch 440, one side of the main power takes two paths, One of these, by wires 474, 476, 478, 480, 482 and 484 feeds one side of the manual switches as shown; power lead 474 also feeds one side of notcher switch 222, and the common switch arm of shear switch 384. The other branch of the power feeds by power line 486 to one side of each of the cylinder retract switches 164, 168, and 172 by wires 488, 490 and 492 respectively. A branch power line 494 feeds through the material switch 406, through the contacts 496 and 498 of the "manual-automatic" switch 442, and thence to the relays by wire 500 and by wire 502.

The operation of the circuit and the machine is as follows: Assuming that strip stock 250 has been fed into the machine so that material switch 406 is closed, switch 442 is now closed so that an electrical connection is made across contacts 496 and 498, and across contacts 504 and 506. Nothing will happen until any one of the switches 444, 446 or 448, is momentarily closed and opened. Assume that it is switch 444 which is momentarily closed. This feeds current into the advance terminal A of cylinder 52 through wires 474, 476, 508 and 510. Power is also fed by wires 474, 476, 508 and 512 to the normally closed contact 514 of relay 462, and thence by the relay switch arm 516 and wire 518 to the normally open switch 136. The piston rod of cylinder 52 advances, until it closes switch 172.

When switch 172 is closed, it feeds power from line 486, 492, and 520 to the retract R terminal of cylinder 52. Power also feeds from this same path by wire 522 to the coil 468 of relay 460. This relay now is energized and its relay arms 524 and 526 swing to the right. Power now feeds from line 500 through relay arm 524, contact 528 and wire 530 to coil 470 of relay 462, to energize that relay. This causes the relay arms 532 and 516 to move to the right to establish a holding circuit for this relay through wires 474, wire 534, the normally closed contacts of switch 384, wires 536 and 538, contacts 504 and 506 of switch 442, wire 540, relay contact 542, relay arm 532, and wire 544 to the coil 470. Relay 462 therefore stays closed, even though relay 460 has opened again as soon as switch 172 is released.

The energization of relay 460 also causes the notcher to cycle once, as follows: Power feeds to the retract terminal R of cylinder 60 from switch 442 by means of wires 502 and 600, contact 602 of relay 458, switch arm 562 of this relay, wire 574, switch arm 526 of relay 460, contact 624, wire 626, and wires 578, 610, and 580. (It will be remembered that, as shown in Fig. 4, the piston rod of cylinder 60 is in its extended position, and to perform a notching operation, the piston rod must be retracted.) This causes the piston rod of cylinder 60 to retract to notch rim stock. At the end of its retract stroke it momentarily closes contact 222, feeding power to the advance A terminal to restore the piston to its extended position again so that a measured length of stock can pass through the notcher.

The momentary closing of switch 138 on the retract stroke of cylinder 52, feeds power by wires 500, 546, 548, 550, 552, 554 and 556 to the advance terminal of cylinder 50, which causes its piston rod to advance and close, momentarily, the retract switch 168. The closing of switch 168 does two things: it feeds power by wires 486, 490, and 558 to the retract terminal R of cylinder 50, thereby causing the piston rod to retract; and it also feeds power by these wires and wire 560 to coil 466 or relay 458.

The switch arm 562 of relay 458 swings to the right and makes contact with contact 564. Power flows from switch 442 through wires 502, 568 and 570, normally closed contact 572 of relay 460, relay switch arm 526, wire 574, relay arm 562, contact 564, wire 576, wire 578, wire 610, wire 580, to the retract terminal R of the notcher cylinder 60 to again notch the V-shaped channel.

The retract stroke of cylinder 50 momentarily closes switch 136. This feeds power to the advance terminal A of cylinder 48 by means of wires 500, 546, 548, 550, 518, relay arm 516, contact 584 (relay 462 still being in the "locked" or energized condition), and wire 586.

The piston of cylinder 48 now advances and momentarily closes the retract switch 164. This feeds power to the retract terminal R of the cylinder 48 by way of wires 486, 488, 590, and 592. It also energizes coil 472 of relay 464 by wire 594. The switch arms 596 and 598 of relay 464 swing to the right, and cylinder 60 again has its retract terminal R energized by power through wires 502, 600, contact 602 of relay 458, relay arm 562, wire 574, wire 604, relay arm 598, contact 606, wires 608, 610 and 580. This again causes the notcher to notch, with the switch 222 advancing (restoring) it again to the Fig. 4 position.

Shearing cylinder 62 also is energized at this time by power delivered to its advance terminal A by means of wires 500, 546, relay arm 596, contact 612 on relay 464, wire 614 and wire 616. The piston rod of this cylinder now advances upward to cause the rocker arm to sever the rim channel, and at the end of its advance upward stroke, the normally closed contacts of switch 384 are opened. This breaks the previously established holding circuit to relay 462, and this relay now becomes de-energized. At the same time, the normally open contacts of switch 384 are momentarily closed, and this feeds power to the retract terminal R of cylinder 62 by means of wires 474, 534 and 618 to open the cutter blades.

Meanwhile, the piston rod of cylinder 48 is retracting, and it momentarily closes the contacts of switch 134. This feeds power to the advance terminal A of cylinder 50 again, by means of wires 500, 546, 548, 620, and 556. The piston of this cylinder again momentarily closes switch 168 to retract itself, and to energize relay 458 again. Energization of relay 458 again energizes the notcher by way of relay 460. The retraction of the piston rod of cylinder 50 in turn momentarily closes switch 136. This feeds power to the advance terminal A of cylinder 52 by means of wires 500, 546, 548, 550, 518, relay arm 516, contact 514, wire 512, and wire 510. This causes the piston of cylinder 52 to advance, and the cycle repeats itself automatically.

In order to break this cycle, all that is necessary is to shut off the power to the machine or to open switch 442.

To operate the various feed, shearing, and notching cylinders manually, the switch 440 is closed, and switch 442 is left open with no electrical connections through it. Then each of the cylinders has a switch feeding power directly to the advance terminal of each, with the exception of the notcher cylinder, in which case power is fed directly by the respective switch to the retract terminal. These connections are shown in light lines, and since their operation is obvious in each case, only one is detailed, as follows: Looking, for example, at switch 446 which controls cylinder 50, power is led directly to the advance terminal A thereof by means of wire 478, switch 446, and wire 622. Momentary closing of switch 446 will cause the piston rod of cylinder 50 to advance. Retraction will take place automatically as soon as the retract switch 168 is closed by the piston rod.

Thus it is seen that in its automatic operation, each of the feed cylinders feeds a certain amount of rim stock into the machine and then closes two things: (1) It closes a switch to retract its piston rod, and (2) it actuates the notcher. On the return stroke of the piston rod of any cylinder, it causes the energization of the next succeeding cylinder in the cycle. That is, the feed cylinders operate in this order: Cylinders 48, 50, 52, 50, 48, 50, 52 and so forth, each cylinder measuring out its preset length of rim channel between notching operations. The shearing means is operated only by cylinder 48, and a reference to Fig. 11 will explain why this is done.

As has been explained, the shearing means is made adjustable in respect to its distance from the notcher. The drawing shows a length of rim stock, and by numerals 628 and 630 is shown the place where the shearing means severs this piece of rim stock from, respectively, the preceding length 632, and the succeeding length 634. The length indicated by numeral 636 is measured by cylinder 48, but the shearing means is preferably adjusted to cut the distance between adjacent notches approximately in half, as shown. Thus one half the distance 636 becomes the tail end of one complete strip, and the other half becomes the front end of the next strip. The lengths 638 and 640 are measured by the successive operations of cylinder 50, and the length 642 is measured by cylinder 52.

In use, of course, the strip is bent at the notches to form a rectangle which fits over and reinforces, as well as decorates, the edges of a jewelry box. The piece shown in Fig. 11 makes a rectangle when bent. However, the machine may be adjusted to vary the lengths 636, 638 and 642 (length 640 always being equal to length 638), to accommodate any box having a four sided shape. By changing the number of feed cylinders, other shapes may be made on the same basic machine, and using its principles.

As to adjustment, the position of stop 54 determines the length 636, the position of stop 56 determines the lengths 638 and 640, and the position of stop 58 determines the length 642. The shearing means 16 can be adjusted to give the desired position between notches at which the cut is made, after stop 54 is adjusted. The various guide rollers and rails are all made adjustable, as has been indicated, so as to facilitate the feeding of the strip stock and feeding the partly-formed and completely-formed channels.

In view of the above, it will be seen that the several objects of the invention are achieved and other advantageous results obtained.

As many changes could be made in the above embodiments and methods without departing from the scope of the invention, it is intended that all matter contained in the above description shall be interpreted as illustrative and not in a limiting sense.

I claim:

1. A machine for making box reinforcing rims comprising a base; feed means on said base for feeding strip stock thereto; first forming means on said base for forming said stock into a first channel whose sides form an angle with each other; a plurality of measuring means on said base, each of said measuring means being actuated in sequence by the actuation of an adjacent measuring means, and each measuring means cooperating with said feed means for governing feed of said stock in predetermined amounts; notching means on the base and operatively connected to said feed means for notching at least one side of said channel; second forming means on the base for further forming said channel, after the notching thereof, into a second channel; shearing means on the base for severing a section of formed stock from its parent stock; and control means for governing in predetermined sequence the operations of said feed means, said forming means, said notching means, and said shearing means whereby said notching means notches said first channel after each operation of said feed means, but said shearing means operates only after a predetermined one operation of said feed means.

2. The machine of claim 1 in which said feed means and first forming means comprise a movable rack and pinion operatively engaging a form roll rotating in pressure engagement with another roll, the periphery of said form roll being shaped to form from said strip stock said first channel.

3. The machine of claim 1 in which said second forming means comprises a form roll rotating in pressure engagement with another roll, the periphery of said form roll being shaped to form from said first channel said second channel.

4. The machine of claim 1 in which said notching means comprises a pair of sub-assemblies having lands and grooves, the lands of one of said sub-assemblies fitting closely but slidably into the grooves of the other of said sub-assemblies, with the opposing ends of said lands and grooves formed at an angle to the length of said lands and grooves, thereby to present on opposite faces of said first channel passing between said ends a series of opposed cutting edges.

5. The machine of claim 1 in which said shear means is adjustably positioned between said notching means and said second forming means, and in which said shear means is actuated by said feed means always at the end of a predetermined number of feeding and notching operations.

6. A machine for making box reinforcing rims comprising a base; a plurality of racks slidable on said base; means for actuating said racks; pinions engaged by said racks and rotated thereby; a plurality of slip clutches mounted on a common shaft, with each of said clutches being actuated by one of said pinions, said common shaft being rotated in a predetermined direction by motion of any rack in one direction, but not being rotated by the motion of any rack in a direction opposite to said one direction; feed means operatively connected to said common shaft; adjustable means for limiting the lengthwise motion of each of said racks and hence motion of said feed means; notching means timed by the stroke of each of said racks for notching rim stock passing therethrough; forming means associated with said feed means and controlled by said feed means; shear means on said base for cutting formed stock; and means for controlling in predetermined sequence the operation of said racks, said notching means, and said shear means.

7. The machine of claim 6 in which said means for operating said racks comprise fluid-operated cylinders having piston rods connected to said racks, and in which said adjustable means for limiting the motion of said racks comprise stop members adjustably clamped to said base in the respective paths of said piston rods.

8. The machine of claim 6 in which said adjustable means for limiting the lengthwise motion of each of said racks includes means for initiating the actuation of an adjacent rack upon the completion of the stroke of each rack.

9. The machine of claim 6 in which said notching means is actuated by the piston rod of a fluid-operated cylinder, the operation of said cylinder being controlled by each of said racks.

10. The machine of claim 6 in which said shearing means is actuated by the piston rod of a fluid-operated cylinder, the operation of said cylinder being controlled by one of said racks.

11. The machine of claim 6 in which the means for operating each of said racks is a first fluid-operated cylinder having a piston rod connected to the rack; in which said adjustable means for limiting the motion of each of said racks is a stop member adjustably clamped to said base; in which said notching means is actuated by the piston rod of a second fluid-operated cylinder; in which said shearing means is actuated by the piston rod of a third fluid-operated cylinder; and in which is provided in operative association with each of said racks means for causing actuation of an adjacent rack and said second cylinder, one of said racks having operatively associated therewith means for causing actuation of said third cylinder after a predetermined number of operations of said second cylinder.

12. The machine of claim 6 in which said means for driving said racks comprises first, second and third fluid-operated cylinders, each having associated therewith an electrically operated fluid valve for admitting fluid into the cylinder, and a pair of electrical switches, a first of these switches being actuated by the forward stroke of the respective cylinder and the second of these switches being actuated by the return stroke of the cylinder; and in which each of said notching means and shearing means is motivated by a fluid-operated cylinder; and in which said control means is connected so that the first switch of the first cylinder actuates both of the cylinders for the notching and shearing means and the second switch of the first cylinder actuates the valve of the second cylinder, the first switch of the second cylinder actuates the cylinder for the notching means, and the second switch of the second cylinder actuates the valve of the third cylinder, the first switch of the third cylinder actuates the valve of the notching cylinder and the second switch of the third cylinder actuates the valve of the second cylinder, the first switch of the second cylinder actuates the valve of the notching cylinder and the second switch of the second cylinder actuates the valve of the first cylinder.

13. A machine for making box reinforcing rims comprising a base; reciprocating means on said base connected to a plurality of slip clutches, each of the latter being mounted on a common shaft and being adapted to rotate said shaft in one direction but not in the opposite direction; combined feed and forming means mounted on the base for guiding, feeding and forming flat strip-stock into a first channel whose sides are at an angle, said feed and forming means being motivated by said common shaft; adjustable means for controlling the extent of motion of said reciprocating means, and hence of said feed and forming means; notching means adjacent said feed and forming means for receiving formed stock from the latter and notching at least one side of said channel; shear means adjustably mounted adjacent said notching means for shearing said formed stock; second forming means mounted adjacent said shear means for forming said first channel into a second channel whose sides are approximately parallel; means controlled by said reciprocating means for actuating said notching means after the rotation of said common shaft by each of said slip-clutches; other means controlled by said reciprocating means for actuating said shear means at the end of a predetermined number of notching operations; and control means associated with said reciprocating means for timing the operations thereof.

14. The machine of claim 13 in which said reciprocating means comprises a plurality of rack-and-pinion elements each being driven by an air cylinder and each of said pinions driving one of said slip-clutches; and in which said control means associated with said reciprocating means comprises switching means for electrically operated valve means for each of said air cylinders, the motion of each of said racks controlling the motion of another rack.

15. The machine of claim 13 in which said notching means comprises a pair of sub-assemblies, each of said sub-assemblies comprising a set of flat plates clamped together in face to face relation each of said plates having one edge formed into a V-shaped edge, whereby each sub-assembly has one face forming a series of parallel lands and grooves, the said sub-assemblies being mounted in sliding relationship to each other with the lands of one sub-assembly slidable lengthwise in the grooves of the other assembly, the ends of the lands of one sub-assembly being formed to conform to at least a part of the inside shape of said first channel, and the opposing ends of the lands of the other of said sub-assemblies being formed to conform to at least a part of the outside shape of said first channel, the formed ends of said lands acting as punches to notch at least one side of said first channel.

16. The machine of claim 7 in which said adjustable means for limiting the motion of said racks includes a wedge-shaped plate fastened to said base and having slots therein, and adjustable stop members having portions thereof slidable in said slots and clamped against said plate.

References Cited in the file of this patent

UNITED STATES PATENTS

| | | |
|---|---|---|
| 44,191 | Howard | Sept. 13, 1864 |
| 397,524 | Strang | Feb. 12, 1889 |
| 1,000,144 | Beebe | Aug. 8, 1911 |
| 1,093,578 | Sommer | Apr. 14, 1914 |
| 1,189,237 | Burke | July 4, 1916 |
| 1,271,569 | Hancock | July 9, 1918 |
| 1,468,941 | Fuller | Sept. 25, 1923 |
| 1,507,872 | Van Orman | Sept. 9, 1924 |
| 1,605,241 | Kellogg | Nov. 2, 1926 |
| 1,759,025 | Sutherland | May 20, 1930 |
| 1,773,856 | Peters | Aug. 26, 1930 |
| 1,853,062 | Keller | Apr. 12, 1932 |
| 1,959,027 | Hemstreet | May 15, 1934 |
| 2,003,448 | Kruse | June 4, 1935 |
| 2,092,255 | Keller | Sept. 7, 1937 |
| 2,128,620 | Lyons | Aug. 30, 1938 |
| 2,227,185 | Goldsmith | Dec. 31, 1940 |
| 2,482,136 | Wright | Sept. 20, 1949 |
| 2,485,684 | Norquist | Oct. 25, 1949 |
| 2,585,131 | Jorgensen | Feb. 12, 1952 |
| 2,605,748 | Rasoletti | Aug. 5, 1952 |
| 2,605,751 | Perry | Aug. 5, 1952 |
| 2,613,719 | Conrad | Oct. 14, 1952 |
| 2,688,847 | Harness | Sept. 14, 1954 |
| 2,736,785 | Dubois | Feb. 28, 1956 |

FOREIGN PATENTS

| | | |
|---|---|---|
| 517,654 | Belgium | Feb. 28, 1953 |